(12) United States Patent
Cerruti et al.

(10) Patent No.: US 7,864,953 B2
(45) Date of Patent: Jan. 4, 2011

(54) ADDING AN ADDITIONAL LEVEL OF INDIRECTION TO TITLE KEY ENCRYPTION

(75) Inventors: Julian A. Cerruti, San Jose, CA (US); Matthew Francis Rutkowski, Pflugerville, TX (US); Amal Ahmed Shaheen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 12/056,626

(22) Filed: Mar. 27, 2008

(65) Prior Publication Data
US 2009/0028342 A1  Jan. 29, 2009

Related U.S. Application Data

(63) Continuation of application No. 11/011,241, filed on Dec. 14, 2004, now abandoned.

(51) Int. Cl.
*H04L 9/00* (2006.01)
(52) U.S. Cl. .................. 380/45; 380/277; 380/278
(58) Field of Classification Search .......... None
See application file for complete search history.

(56) References Cited

U.S. PATENT DOCUMENTS

| | | | | |
|---|---|---|---|---|
| 6,058,188 | A * | 5/2000 | Chandersekaran et al. | 380/286 |
| 7,152,166 | B2 * | 12/2006 | Strom et al. | 713/193 |
| 7,178,025 | B2 * | 2/2007 | Scheidt et al. | 713/168 |
| 7,499,550 | B2 * | 3/2009 | Athaide et al. | 380/278 |
| 2002/0104001 | A1 | 8/2002 | Lotspiech et al. | |
| 2003/0005309 | A1 * | 1/2003 | Ripley et al. | 713/185 |
| 2003/0016826 | A1 | 1/2003 | Asano et al. | |
| 2003/0095664 | A1 | 5/2003 | Asano et al. | |
| 2003/0190044 | A1 * | 10/2003 | Higashi et al. | 380/201 |
| 2003/0194092 | A1 * | 10/2003 | Parks et al. | 380/281 |
| 2003/0198351 | A1 * | 10/2003 | Foster et al. | 380/281 |

(Continued)

FOREIGN PATENT DOCUMENTS

JP      2004-139473      5/2004

(Continued)

OTHER PUBLICATIONS

IBM, "xCP: eXtensible Content Protection," IBM Research Division Almaden Research Center, Jul. 18, 2003, pp. 1-5.

(Continued)

*Primary Examiner*—Emmanuel L Moise
*Assistant Examiner*—Luu Pham
(74) *Attorney, Agent, or Firm*—Libby Z. Toub; Schubert Law Group PLLC

(57) ABSTRACT

Systems, methods and media for encrypting and decrypting content files are disclosed. More particularly, hardware and/or software for adding an additional level of indirection to a title key encryption scheme are disclosed. Embodiments may include generating by a cryptographic system a binding key based on binding information. Embodiments may also include encrypting by the cryptographic system a secret key with the binding key and generating a title key associated with at least one content file. Embodiments may also include encrypting by the cryptographic system the title key with the secret key and the at least one content file with the title key. Further embodiments may include receiving an indication that the binding information has changed, generating a new binding key based on the new changed binding information, and re-encrypting the secret key with the new binding key.

20 Claims, 5 Drawing Sheets

U.S. PATENT DOCUMENTS

| | | |
|---|---|---|
| 2003/0200176 A1 | 10/2003 | Foster et al. |
| 2004/0003267 A1* | 1/2004 | Strom et al. ................. 713/193 |
| 2004/0078586 A1* | 4/2004 | Sato et al. ................... 713/193 |
| 2004/0120529 A1 | 6/2004 | Zhang et al. |
| 2005/0086532 A1* | 4/2005 | Lotspiech et al. ........... 713/201 |
| 2005/0226416 A1 | 10/2005 | Jung et al. |
| 2006/0059573 A1* | 3/2006 | Jung et al. .................... 726/31 |
| 2007/0112685 A1* | 5/2007 | Yamamichi .................. 705/64 |

OTHER PUBLICATIONS

IBM, "IBM Response to DVB-CPT Call for Proposals for Content Protection & Copy Management: xCP Cluster Protocol," IBM Almaden Research Center, Oct. 19, 2001, pp. 1-36.

* cited by examiner

ADDING AN ADDITIONAL LEVEL OF INDIRECTION TO TITLE KEY ENCRYPTION

CROSS-REFERENCES TO RELATED APPLICATIONS

Pursuant to 35 USC §120, this continuation application claims priority to and benefit of U.S. patent application Ser. No. 11/011,241, entitled "SYSTEMS, METHODS, AND MEDIA FOR ADDING AN ADDITIONAL LEVEL OF INDIRECTION TO TITLE KEY ENCRYPTION", filed on Dec. 14, 2004 now abandoned, the disclosure of which is incorporated herein in its entirety for all purposes.

FIELD OF INVENTION

The present invention is in the field of data encryption. More particularly, the present invention relates to systems, methods and media for adding an additional level of indirection to title key encryption mechanisms used for content encryption.

BACKGROUND

As the use of digital technology becomes more pervasive, content such as television programming, music, and movies are being increasingly delivered to consumers in digital format. Content owners, such as record labels, studios, distribution networks, and artists, desire for their content to only be used by certain users or in certain ways. Protecting the copyrights of these content owners from indiscriminate reproduction and distribution poses a considerable challenge in the digital age, as exact duplicates of the content may often be easily created and transmitted to other users.

Content protection schemes for digital media attempt to protect the content enough to discourage at least casual violations of the content copyright while minimizing the cost and processing power necessary to implement the scheme and making the process as transparent to users as possible. One common type of content protection scheme is to encrypt the content with a key. A recipient of the encrypted content with a copy of the key may decrypt and access the content, while a recipient without a copy of the key (such as a third party attempting to improperly access the content) will be unable to decrypt and access the content. The content owner may also revoke a key if it believes the key has been jeopardized, reducing the ability for users to distribute keys to others (such as by posting the keys on the Internet).

Broadcast encryption schemes allow digital delivery of encrypted content without requiring two-way communication between the recipient and source, eliminating the two-way communications (such as handshakes) necessary for many public distribution systems while potentially improving security. By eliminating two-way communications, the potentially expensive return channel on a receiver may be eliminated, lowering overhead and costs for device manufacturers and users. A home network, for example, that shares content among a cluster of different recording or playback devices, such as stereos, personal computers, and televisions, may use a broadcast encryption scheme to protect content in different forms of storage from unauthorized use. Some broadcast encryption schemes, such as International Business Machine Corp.'s (IBM's) eXtensible Cluster Protocol (xCP), provide for binding protected content to a dynamic cluster of networked recording and playback devices, allowing for the content to be managed under a single protection scheme independent of particular storage or transmission interfaces and protocols. Content in IBM's xCP scheme may move freely among devices in the domain but will be useless to devices outside the domain. Other examples of broadcast encryption applications include Content Protection for Recordable Media (CPRM) media, Content Protection for Pre-Recorded Media (CPPM) media, and Advanced Access Content System (AACS) next-generation media.

Broadcast encryption schemes bind a piece of content to a particular entity, such as a piece of media, a server, or a user. Broadcast encryption binds the content by using a media key block (also known as a key management block KMB or session key block) that allows compliant devices to calculate a cryptographic key (the media or management key, or Km) using their internal device keys while preventing circumvention (non-compliant) devices from doing the same. Broadcast encryption does not require authentication of a device and can be implemented with symmetric encryption, allowing it to be much more efficient than public key cryptography. After calculating a media key Km by processing the media key block (MKB), the scheme uses the media key Km to bind the content to an entity (with a binding identifier IDb), resulting in the binding key (Kb). A title key (Kt) is then chosen and encrypted with the binding key Kb, resulting in an encrypted title key (EKt). The content itself may then be encrypted with the title key Kt and the encrypted content may be stored with the encrypted title key EKt. A compliant device that receives the encrypted content and the encrypted title key EKt may use the same MKB and the binding identifier IDb to decrypt the content. The compliant device first may reproduce the same binding key Kb using the MKB, the binding identifier IDb and its device keys, and then decrypts the title key Kt from the encrypted title key EKt using the binding key Kb. Once the compliant device has the title key Kt, it may decrypt the content itself. A circumvention device will not have device keys that can be used to process the MKB and thus will not be able to reproduce the binding key Kb or be able to decrypt the content. Also, if the content has been copied to a different entity with a different identifier IDb' by a non-compliant device, the compliant device with valid device keys will not be able to calculate the correct binding key Kb because the binding identifier IDb' is different than the original one.

While the above broadcast encryption scheme provides an effective mechanism for providing encrypted broadcast content to a group of devices, it suffers from some disadvantages. For example, the encryption of the content depends upon the MKB and binding identifier IDb used in the process of encrypting the content, either of which may change frequently under certain circumstances. New MKB's which revoke non-compliant devices may be introduced into a system in some cases, changing the system MKB. If devices are added to or leaves a cluster, the binding identifier IDb changes (by changing the authorization table, one of its components). If either the MKB or binding identifier IDb of a particular entity change, any piece of content that is bound to this entity using a binding key Kb dependent upon them must have its title key re-encrypted using the new values so that compliant devices will still be able to access the content. If there are large amounts of content that need to be changed, re-encryption of the title keys Kt for each of them will require significant amounts of processing time. For content files that are shared over a network, there may also be remote synchronization problems. An arbitration mechanism would be required to ensure that only one device performs the re-encryption of the title keys for a particular piece of content.

The problems described above are exacerbated on many network content-sharing systems with large numbers of small content files, such as home-based or consumer networks.

Content is typically delivered to consumers in many small files which results in a very large number of files on a home network. For example, each song oil a music album may be a separate file (and thus have a separate encrypted title key) and a user may have hundreds or thousands of songs. Consumer devices, such as stereos or video players, also typically have relatively small amounts of processing power. The combination of the large number of files to be re-encrypted and the lower capability of consumer devices results in a very inefficient and time-consuming procedure that must be performed each time binding information changes. The problems described above may also occur in Advanced Access Content Systems (AACS) and 4C Entity LLC's Content Protection System. Architecture (CPSA) recordable media where several files may be stored and new MKB's may be introduced into the system.

There is, therefore, a need for an effective and efficient system of encrypting content on a broadcast encryption system. There is a particular need for such a system when there are a large number of encrypted content files to be handled.

SUMMARY

The problems identified above are in large part addressed by systems, methods and media for adding an additional layer of indirection to title key encryption. One embodiment includes generating by a cryptographic system a binding key based on binding information. Embodiments may also include encrypting by the cryptographic system a secret key with the binding key and generating a title key associated with at least one content file. Embodiments may also include encrypting by the cryptographic system the title key with the secret key and the at least one content file with the title key. Further embodiments may include receiving an indication that the binding information has changed, generating a new binding key based on the new changed binding information, and re-encrypting the secret key with the new binding key.

Another embodiment a method for decrypting an encrypted content file. The embodiment generally includes accessing by a cryptographic system an encrypted secret key and an encrypted title key and generating by the cryptographic system a binding key based on binding information. The embodiment may also include decrypting by the cryptographic system the encrypted secret key with the binding key to recover a secret key and decrypting the encrypted title key with the secret key to recover a title key. The embodiment also may include decrypting by the cryptographic system the encrypted content with the title key. Further embodiments may include receiving by the cryptographic system the encrypted secret key and the encrypted title key from a source.

A further embodiment provides a data processing system for encrypting one or more content files. The system may generally include a reception system for receiving information from a source and a transmission system for transmitting information to a recipient. The system may also generally include a binding key system for generating a binding key from binding information and a secret key system for accessing a secret key and encrypting the secret key using the generated binding key. The system may also generally include a title key system for generating a title key and encrypting the title key with the secret key and an encryption/decryption system for encrypting the one or more content files using the title key. Further embodiments include the reception system being further adapted to receive an indication that the binding information has changed.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Systems, methods and media for encrypting and decrypting content files are disclosed. More particularly, hardware and/or software for adding an additional level of indirection to a title key encryption scheme are disclosed. Embodiments may include generating by a cryptographic system a binding key based on binding information. Embodiments may also include encrypting by the cryptographic system a secret key with the binding key and generating a title key associated with at least one content file. Embodiments may also include encrypting by the cryptographic system the title key with the secret key and the at least one content file with the title key. Further embodiments may include receiving an indication that the binding information has changed, generating a new binding key based on the new changed binding information, and re-encrypting the secret key with the new binding key.

By using a secret key to encrypt the title key, an additional level of indirection for title key encryption is added. The addition of the secret key reduces the amount of processing time required in the event that binding information changes. In prior art systems, changes in the binding information necessitated re-encrypting each title key with a new binding key created from the new binding information. As each piece of content in some systems may have its own title key, the amount of re-encryption processing can be very large. Under the content encryption system of the disclosed embodiments, only the secret key need be re-encrypted in the event that binding information changes. As a secret key can be associated with any amount of content files, the use of a secret key in addition to a title key advantageously reduces the amount of processing required when binding information changes.

While specific embodiments will be described below with reference to particular configurations of hardware and/or software, those of skill in the art will realize that embodiments of the present invention may advantageously be implemented with other substantially equivalent hardware and/or software systems.

Figure 1:
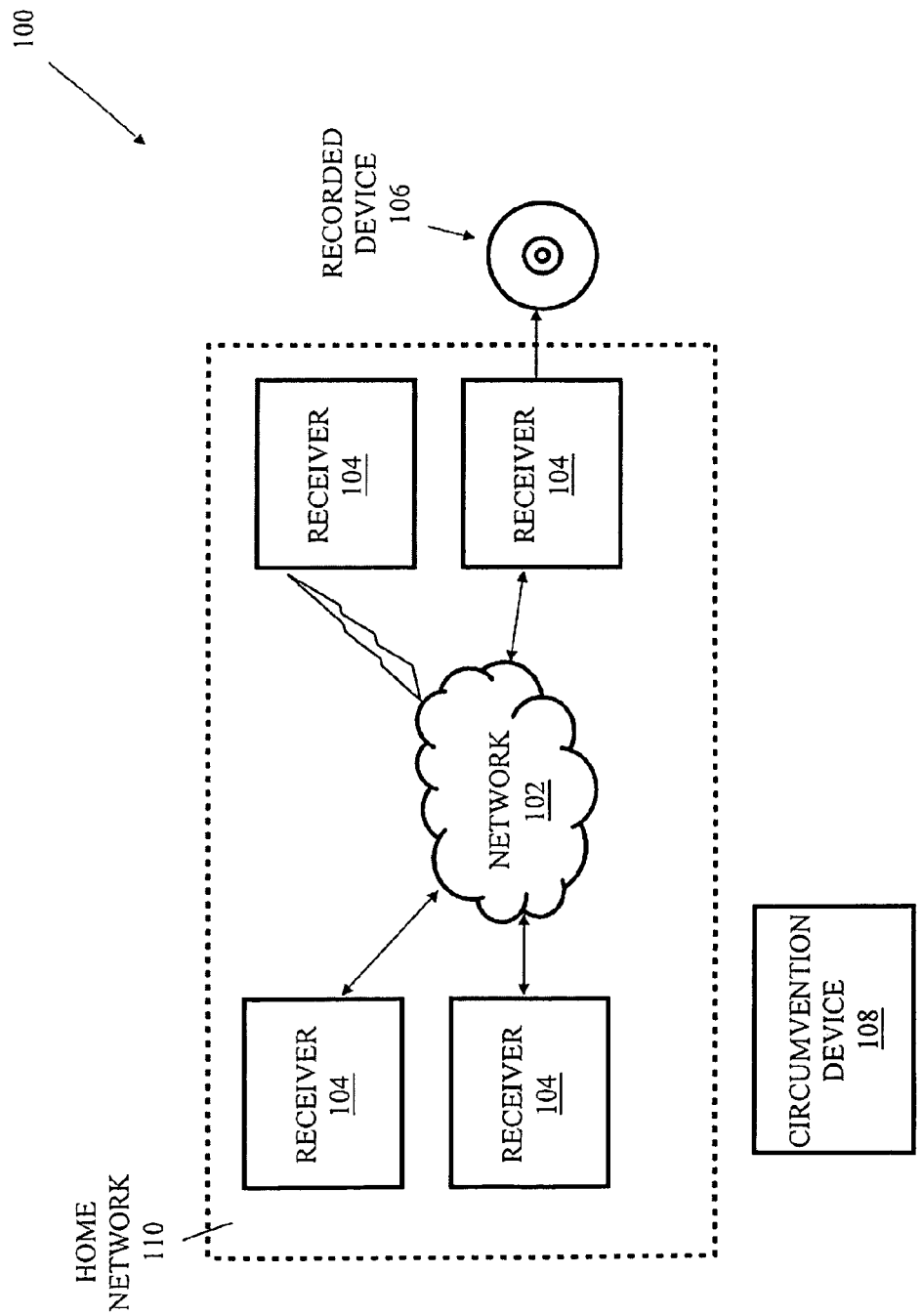
FIG. 1 depicts an environment for a content encryption system for a home network according to one embodiment.

Turning now to the drawings, FIG. 1, depicts an environment for a, content encryption system for a home network according to one embodiment. In the depicted embodiment, the content encryption system 100 includes a broadcast encryption scheme implemented over one or more receivers 104 networked together via network 102 in a cluster that forms a home network 110. Network 102 may be any type of wired or wireless network, such as Local Area Networks (LANs) or Wide Area Networks (WANs). Each receiver 104 may be considered a peer as a participant in the cluster. Content may be any data deliverable from a source to a recipient (from one receiver 104 to another) and may be in the form of files, such as an audio data file, a video data file, a media data file, a streaming media file, an application file, a text file, or a graphic file. The content encryption system 100 of the depicted embodiment allows the receivers 104 within the home network 110 to freely share (and utilize) encrypted content between them while preventing non-compliant devices from decrypting the encrypted content. A receiver 104 may optionally have the ability to record content onto a recorded device 106 for use outside the home network 110. A circumvention device 108 is depicted solely to represent a non-compliant device that is denied access to protected content on the home network 110.

One or more of the receivers 104 may act as a cluster server that may update MKBs and/or authorize other devices, such as a home gateway of a home network 110. The cluster server may include a media key block (MKB), a common network identifier known as a binding identifier (IDb), and an authorization table. As described in more detail in relation to FIG. 3, the binding key (Kb) may be created as a combination of the MKB, the IDb, and the authorization table. The MKB (also known as a session key block, key management block, key media block, or management key block) may typically be sent alongside content and allows compliant devices to calculate a media key (Km) by a process known as "processing the MKB" while preventing non-compliant or circumvention devices 108 from doing the same. The binding identifier IDb may be a common network identifier for the home network 110. The authorization table may include an indication of all devices in the home network 110, including all receivers 104.

A receiver 104 may be any type of device that receives content from a content owner, a content service or from another receiver 104 with a home network 110, such as a content storage, playback, or recording device, including televisions, DVD players, stereos, MP3 players, personal computers, set-top boxes, mobile phones, consumer devices, portable devices, or wearable devices. Receivers 104 may be added or removed from the home network 110 which may necessitate changing the authorization table and thus the binding key Kb.

Home network 110 may be a series of interconnected consumer devices such as receivers 104 that allow the interconnected devices to share content. In one embodiment, home network 110 may include network content protection such as IBM's xCP Cluster, which may provide a trusted domain that groups compliant devices into a group in which content may freely be shared. Devices that are outside the trusted domain cannot compute the right key and thus are unable to access network content. By encrypting the content in a home network 110, the home network 110 owner may freely use her content within any devices in the home network 110 while third parties are prohibited from using copies of the content on their own system. The content encryption system 100 protects the content by requiring a substantially unique binding key Kb for each home network 110 that may be required to access any properly encrypted content. Thus, if a user makes a copy of content of the home network 110 for a friend, that friend will be unable to access that content on their own home network as it will have a different binding key Kb.

Under prior art systems, all content on the home network 110 would be encrypted with a title key Kt which would itself be encrypted with the binding key Kb. Any device that wished to access a piece of content would have to decrypt the content beforehand. To do so, the device would first determine the media key Km from the MKB and then use the media key Km in conjunction with the binding identifier IDb and the authorization table to recover the binding key Kb. The device may then use the binding key Kb to recover the title key Kt from the encrypted title key EKt, and then use the title key Kt to decrypt the encrypted content. Because the title key Kt is encrypted with the binding key Kb, any changes to the binding key Kb necessitate re-encrypting each title key Kt with the new binding key Kb. The binding key Kb of the prior art may change, for example, when a new device is introduced into the home network 110 (changing the authorization table), when a new MKB is brought in from a trusted external source (such as a broadcast channel) and the MKBs are merged, or when the binding identifier IDb is changed.

In the content encryption system 100 of the disclosed embodiments, the need to re-encrypt each title key Kt whenever the binding key Kb changes is eliminated. As described in more detail in relation to FIGS. 2-5, the content encryption system 100 uses a secret key (Ka) to add an additional level of indirection to the title key encryption. First, a binding key Kb is calculated using the same process as in prior art systems. A different secret key Ka is then encrypted with the binding key Kb and the encrypted secret key EKa is kept as part of the state information of a group of content files. A title key Kt is then generated and encrypted with the secret key Ka chosen for the group of files and the content itself is encrypted with the title key Kt. To decrypt a content, a receiver 104 may calculate a binding key Kb from a media key Km and the binding identifier IDb. With the binding key Kb and the encrypted secret key EKa from the state information for the group of files, the receiver 104 may then decrypt the secret key Ka. Using the secret key Ka and the encrypted title key EKt, the receiver 104 may recover the title key Kt and thus the encrypted content. When either the MKB or the binding identifier IDb changes, the receiver 104 need only recalculate. EKa instead of having to recalculate each title key Kt and encrypted title key EKt. In this case, the receiver 104 would calculate the old binding key Kb as well as a new binding key Kb' (based on Km' and/or IDb'). Using the old Kb, the receiver 104 calculates the secret key Ka and then uses that secret key Ka to calculate a new encrypted secret key EKa' using the new binding key Kb'. The state of the group of files need only be updated to use the new encrypted secret key EKa' and any encrypted title keys EKt do not need to be re-encrypted.

By avoiding the need to change and re-encrypt title keys Kt whenever the binding key Kb changes, a significant amount of processing and complication can be advantageously avoided. A receiver 104 may have a very large amount of content files, each with its own encrypted title key EKt, which would take a significant amount of processing to re-encrypt. For example, an audio receiver 104 may have thousands of different song files each with separate encrypted title keys. EKt. A secret key Ka may instead be associated with the content of the audio receiver 104, allowing the methodology of the disclosed embodiments be used to reduce processing power needed to accommodate changes in binding information. In another example, a secret key Ka may apply to all content in a home network 110 that has thousands of music, movies and other content files. By using a secret key Ka associated with that home network 110, the need to re-encrypt each title key Kt when binding information changes is avoided.

Figure 2:
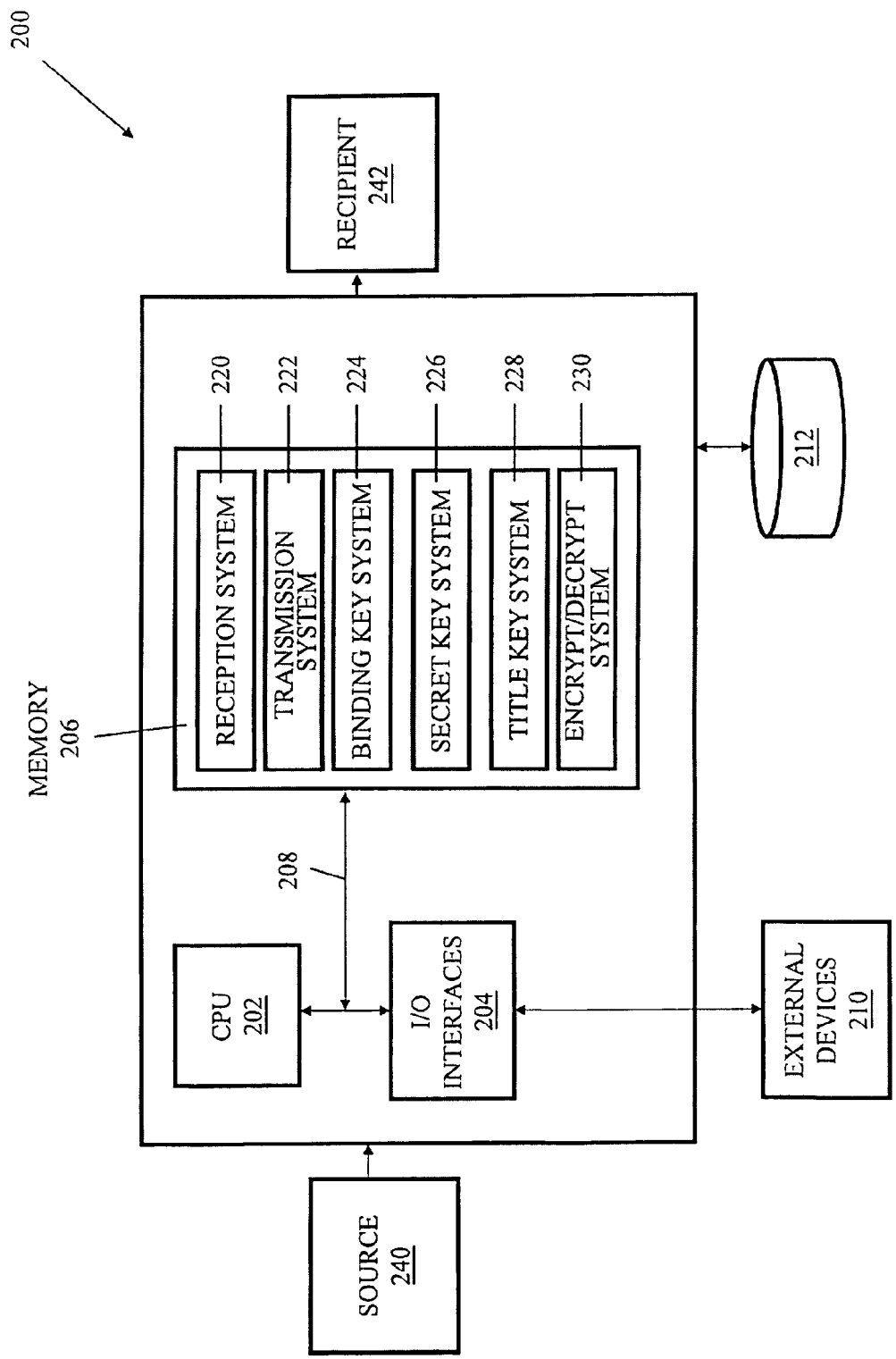
FIG. 2 depicts a cryptographic system of the content encryption system of FIG. 1 according to one embodiment.

FIG. 2 depicts a cryptographic system 200 of the content encryption system 100 of FIG. 1 according to one embodiment. Cryptographic system 200 may any combination of hardware and/or software that may perform one or more of such tasks as receiving/transmitting transmissions, encrypting/decrypting content, encrypting/decrypting keys, and attaching keys to content. A typical cryptographic system 200 may be a general purpose computer with a computer program that, when loaded and executed, carries out the methods described herein. Alternatively, cryptographic system 200 may be a specific use computer system containing specialized hardware for carrying out one or more of the functional tasks of the cryptographic system 200. A specific use computer system may be part of a receiver 104, for example, such as an encryption/decryption module associated with a DVD player. Cryptographic system 200 may include one or more central processing units (CPUs) 202, an input/output (I/O) interface 204, memory 206, a bus 208, external devices 210, and a database 212.

Cryptographic system 200 may also be in communication with a source 240 or a recipient 242. Source 240 may be the source of any content to be encrypted or decrypted or any entity capable of sending transmissions, such as a content owner, a content service provider, or a receiver 104 in a home network 110. Information received from a source 240 may include any type of information, such as encrypted content, content, content usage conditions, a MKB, encrypted title keys EKt, or binding identifiers IDb. Similarly, a recipient 242 may be any entity capable of receiving transmissions or that is a destination for any encrypted content or other information, such as a receiver 104 in a home network 110.

CPU 202 may include a single processing unit or may be distributed across one or more processing units in one or more locations, such as on a client and server or a multi-processor system. I/O interface 204 may include any system for exchanging information with an external source. Memory 206 may include any known type of data storage and/or transmission media, including magnetic media, optical media, random access memory (RAM), read-only memory (ROM), and data caches. Memory 206 may reside at a single physical location, including one or more types of data storage, or it may be distributed across a plurality of physical systems in various forms. Bus 208 may provide a communications link between components of cryptographic system 200, such as between the CPU 202 and the memory 206, and may include any type of communication link, including electrical, optical, or wireless links. External devices 210 may include any known type of external device, such as speakers, a video display, a keyboard or other user input device, or a printer. Database 212 may provide storage for information used to facilitate performance of the disclosed embodiments such as storage of encryption keys, encrypted content, binding identifier information, and authorization tables. Database 212 may include one or more storage devices, such as a magnetic disk drive or optical disk drive, and may include data distributed across, for example, a local area network (LAN), a wide area network (WAN), or other network.

Memory 206 may include components stored in memory that perform various tasks, including one or more of a reception system 220, a transmission system 222, a binding key system 224, a secret key system 226, a title key system 228, and an encryption/decryption system 230. Reception system 220 may receive information, such as encrypted content or title keys Kt, in a transmission from a source 240. Transmission system 222 may transmit any information, such as encrypted content, to a recipient 242. Alternatively, transmission system 222 may also store any information in database 212.

The binding key system 224 may generate a binding key Kb from a binding identifier IDb and a media key Km. The binding key system 224 may also generate the media key Km by processing the MKB with a set of device keys. The secret key system 314 may access the secret key Ka and encrypt the secret key Ka using the binding key Kb. The secret key system 314 may also recover the secret key Ka from an encrypted secret key EKa using the binding key Kb. In the event that the secret key Ka changes, the secret key system 314 may also update the state of any affected content files. The title key system 228 may generate a title key Kt and encrypt the title key Kt with a secret key Ka. The encryption/decryption system 230 may use the title key Kt to encrypt or decrypt any content. The operation of the binding key system 224, secret key system 226, title key system 228, and encryption/decryption system 230 are described in more detail in relation to FIGS. 3-5.

Figure 3:
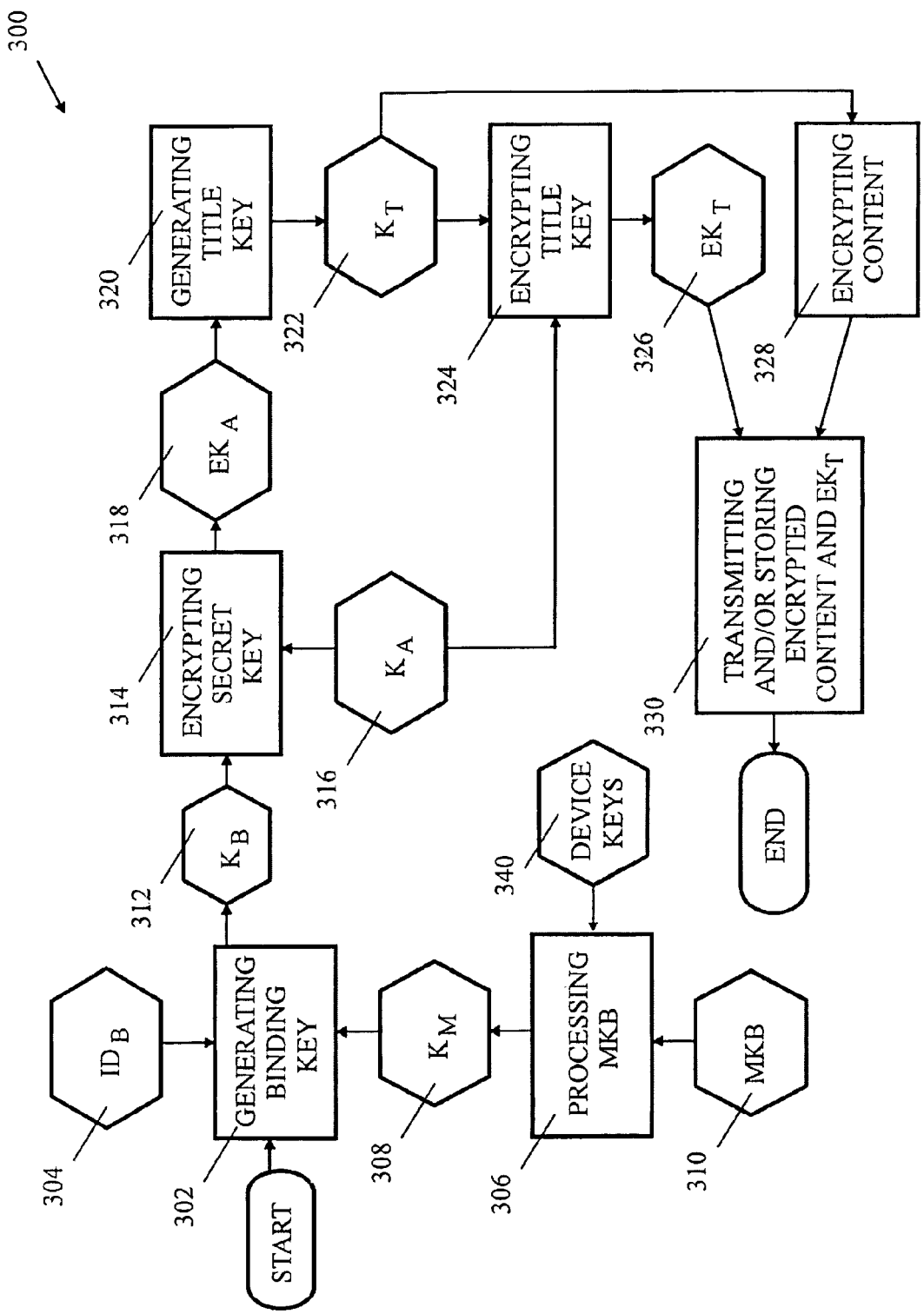
FIG. 3 depicts an example of a flow chart for encrypting content using a title key and a secret key according to one embodiment.

FIG. 3 depicts an example of a flow chart for encrypting content using a title key Kt and a secret key Ka according to one embodiment. In flow chart 300, content may be encrypted and bound to a particular entity, such as a home network 110 or a receiver 104. The elements of the method of flow chart 300 may be performed, in one embodiment, by components of a cryptographic system 200. Flow chart 300 begins with element 302, generating a binding key Kb, which may be performed by binding key system 224. To generate a binding key Kb 312, the binding key system 224 performs a one-way function on a binding identifier IDb 304 using a media key Km 308, as represented by the equation:

$$Kb=G(Km,IDb)$$

in one embodiment. In this embodiment, the G function represents a one-way function where one data value (the media key Km 308) is combined with a second value (the binding identifier IDb) to produce a data value representing a key (the binding key Kb 308). Any type of one-way function for which the inputs may not be deduced from the outputs may be used for the G function, such as the Data Encryption Standard (DES) or Advanced Encryption Standard (AES) one-way functions. The binding key system 224 may calculate the media key Km 308 used at element 302 by processing the MKB 310 using a set; of device keys 340 at element 306. The binding key Kb 312 may uniquely identify the entity the content is being bound to and may include a cryptographic hash of the authorization table.

After generating the binding key Kb 312, flow chart 300 continues to element 314, encrypting the secret key. At element 314, the secret key system 226 of a cryptographic system 200 may encrypt a secret key Ka 316 with the binding key Kb 312 to produce an encrypted secret key EKa 318, as represented by the equation:

$$EKa=E(Kb,Ka)$$

in one embodiment. In this embodiment, the E function represents an encryption function where one value (the secret key Ka 316) is encrypted with another value (the binding key Kb 312) to produce an encrypted block (the encrypted secret key EKa 318). The secret key system 226 may use any type of function, such as a DES or AES encryption function.

The secret key Ka 316 and encrypted secret key EKa 318 may be associated with a group of files of any size. In one embodiment, the secret key Ka 316 may be relatively long lived and unique for a whole group of protected files. In one embodiment, the secret key Ka 316 would change infrequently in comparison to binding information or other types of keys. A secret key Ka 316 may be assigned to a group of protected files of any size. One secret key Ka 316 may be assigned to, for example, each piece of media where several content files are stored, each partition in a file system of a storage device, or a particular group of files on a content server.

After encrypting the secret key Ka 316, flow chart 300 continues to element 320, generating the title key Kt. At element 320, the title key system 228 of the cryptographic system 200 generates a title key Kt 322 and then encrypts the title key Kt 322 with the secret key Ka 316 at element 324 to produce an encrypted title key EKt 326, as represented by the equation:

$$EKt = E(Ka, Kt)$$

in one embodiment. In this embodiment, an encryption function E encrypts one value (the title key Kt 322) with another value (the secret key Ka 316) to produce an encrypted block (the encrypted title key EKt 326). Flow chart 300 also continues to element 328, encrypting content after generating the title key Kt 322. The content itself may be encrypted with the title key Kt 322 by the encryption/decryption system 230. After encrypting the content and the title key Kt 322, flow chart 300 continues to element 330, where the encrypted content and/or the encrypted title key EKt 326 may be transmitted or stored, such as by the transmission system 222, after which the flow chart terminates. In one embodiment, the encrypted content and the encrypted title key EKt 326 associated with that content may be stored or transmitted together for ease of decryption by recipients 242.

Figure 4:
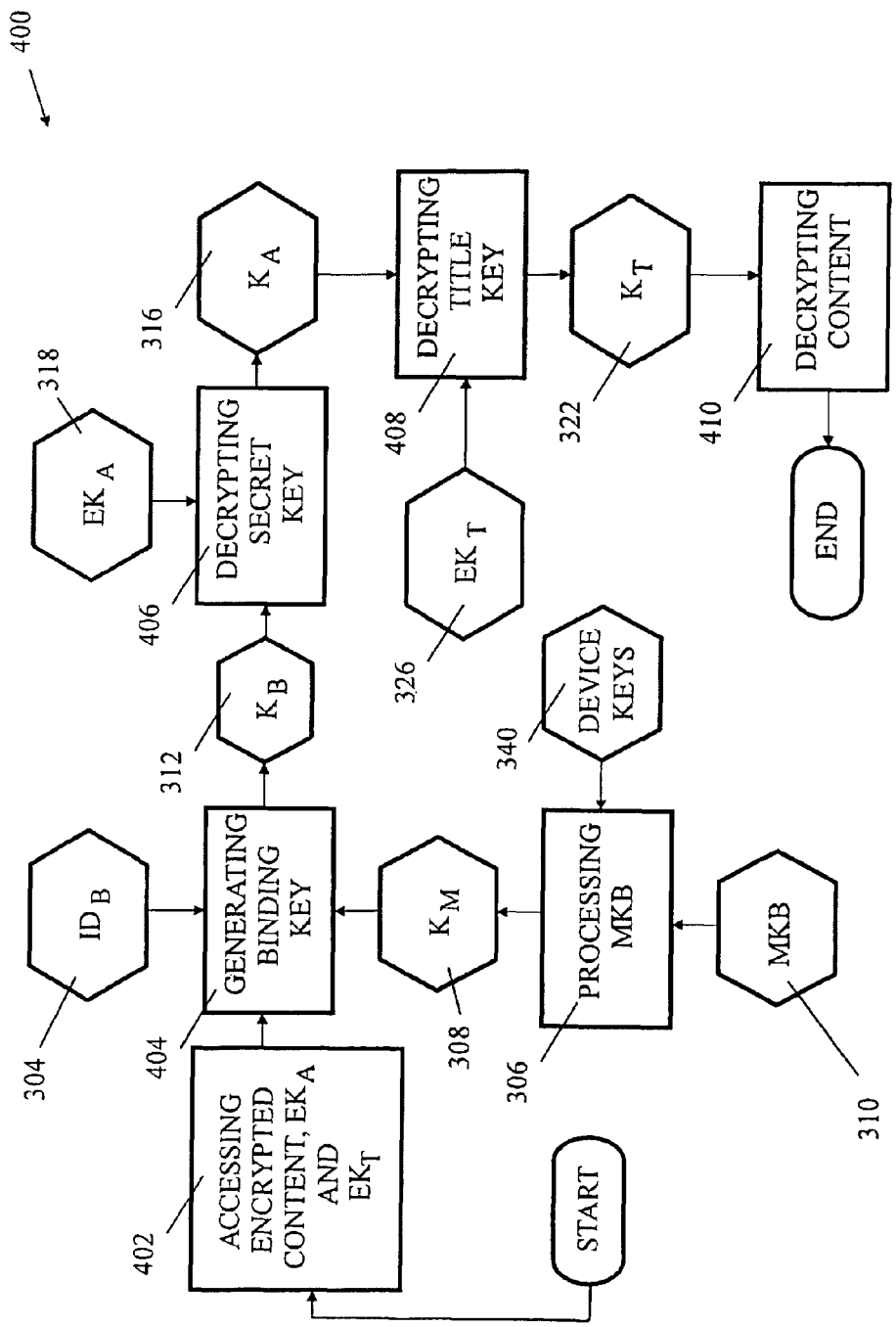
FIG. 4 depicts an example of a flow chart for decrypting encrypted content using a title key and a secret key according to one embodiment.

FIG. 4 depicts an example of a flow chart for decrypting encrypted content using a title key and a secret key according to one embodiment. In flow chart 400, encrypted content may be decrypted by components of a cryptographic system 200 such as a receiver 104. Flow chart 400 begins with element 402, accessing encrypted content, encrypted secret key EKa 318, and an encrypted title key EKt 326. These items may be accessed from any source and in any manner, such as via broadcast or from database 212. The encrypted content is the content to be decrypted in flow chart 400 by using the encrypted secret key EKa 318 and encrypted title key EKt 326. Flow chart 400 then continues to element 404, where the binding key system 224 generates a binding key Kb 312. Element 404 may use substantially the same process as element 302 of FIG. 3 and the discussion will not be repeated. The binding key system 224 may generate the binding key Kb 312 from the binding identifier IDb 304 and the media key Km 308 and it may generate the media key Km 308 by processing the MKB 310 at element 306 using device keys 340.

After generating the binding key Kb 312, flow chart 400 continues to element 406, decrypting the secret key. At element 406, the secret key system 226 of a cryptographic system 200 may recover the secret key Ka 316 using the binding key Kb 312 to decrypt the encrypted secret key EKa 318, as represented by the equation:

$$Ka = E(Kb, EKa)$$

in one embodiment. The encrypted secret key EKa 318 may be part of the state information for a group of content files. Third party circumvention devices 108 will not be able to successfully process the MKB and thus will not be able to decrypt and recover the secret key Ka 316.

After recovering the secret key Ka 316, flow chart 400 continues to element 408, decrypting the title key Kt 322. At element 408, the title key system 228 of the cryptographic system 200 may decrypt the encrypted title key EKt 326 with the secret key Ka 316 to produce the title key EKt 322, as represented by the equation:

$$Kt = E(Ka, EKt)$$

in one embodiment. With the title key 322, the encryption/decryption system 230 may then decrypt the content that is encrypted with the title key 322 at element 410, after which the flow chart terminates.

Figure 5:
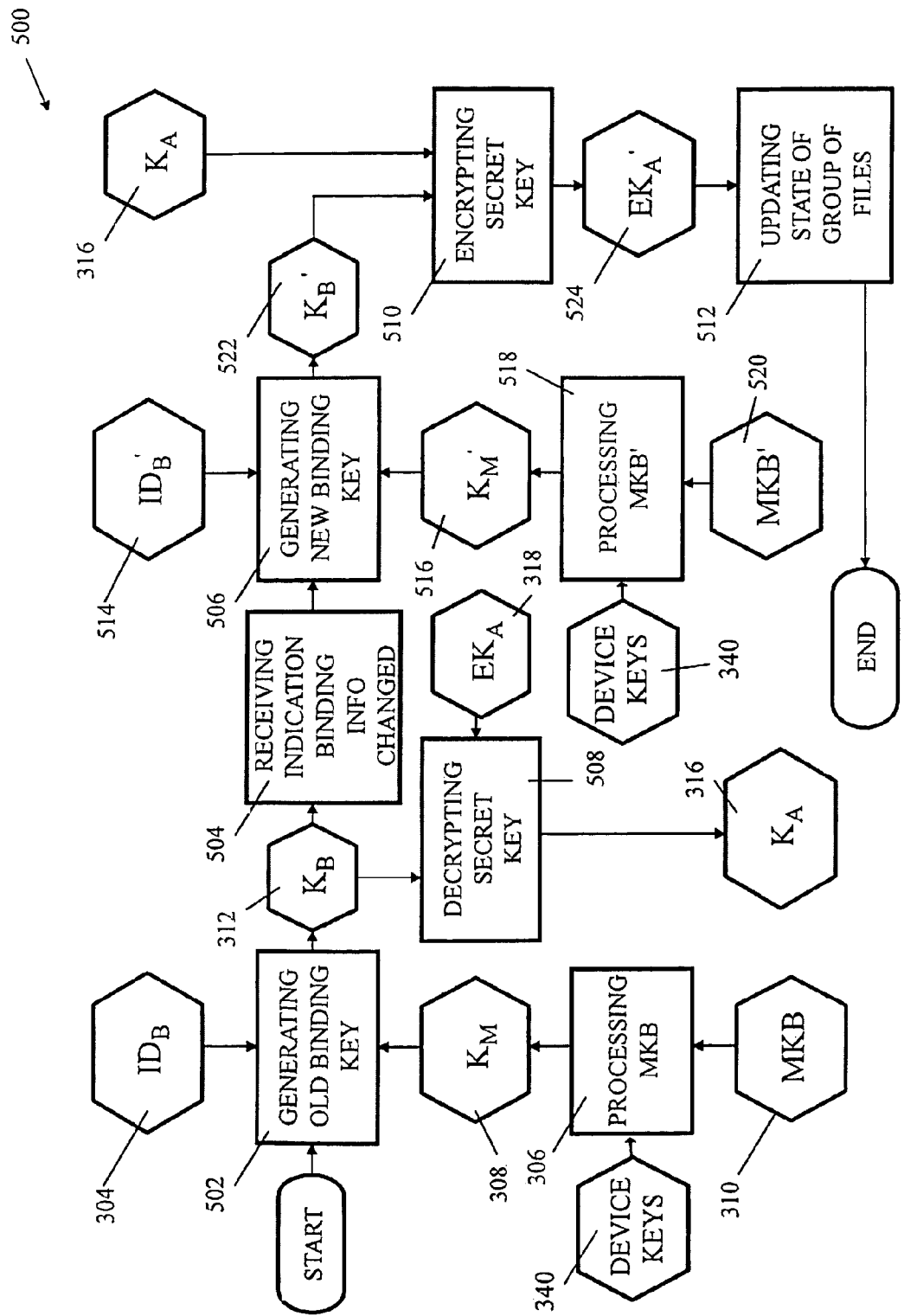
FIG. 5 depicts an example of a flow chart for re-encrypting encrypted content when binding information has changed according to one embodiment.

FIG. 5 depicts an example of a flow chart for re-encrypting encrypted content when binding information has changed according to one embodiment. In flow chart 500, encrypted content may be re-encrypted by components of a cryptographic system 200 such as a receiver 104 or recipient 242. Flow chart 500 begins with element 502, where the binding key system 224 generates a binding key Kb 312 based on existing binding information. Element 404 may use substantially the same process as element 302 of FIG. 3 and element 404 of FIG. 4 (including processing the MKB 310 at element 306) and the discussion will not be repeated. At element 502, the binding key system 224 may generate the binding key Kb 312 from the binding identifier IDb 304 and the media key Km 308 and it may generate the media key Km 308 by processing the MKB 310 at element 306 using device keys 340.

After generating the original binding key Kb 312, flow chart 500 continues to element 504, receiving an indication that the binding information has changed. Binding information may include a binding identifier IDb 304 or the MKB 310. Either binding identifier IDb 304 or the MKB 310, or both, may change to new values of new binding identifier IDB' and/or new MKB'. The binding identifier IDb 304, for example, may change if the authorization table changes, which may occur when a new device enters the network (such as a new receiver 104 in a home network 110). The new binding identifier IDb 304 will result in a change to the binding key Kb 312. The MKB 310 may change whenever a new MKB is brought in from an external source, such as a trusted broadcast stream, and the MKB's are merged, which results in a new media key Km 308 and thus a new binding key Kb 312. Binding information may also change when the rights or permissions on one or more content files changes.

After receiving an indication that the binding information has changed, flow chart 500 continues to element 506, generating a new binding key Kb' 522 using the updated binding information. Element 506 may use substantially the same process as element 302 of FIG. 3, element 404 of FIG. 4, and element 502 and the discussion will not be repeated. The methodology at element 506 may depend on what particular binding information has changed. Element 506 may use a new binding identifier IDb' 514 (or original binding identifier IDb 304 if it has not changed) and/or a new MKB' 520 (or original MKB 310 if it has not changed) to create the new binding key Kb' 522, processing the new MKB' 520 (if available) at element 518 with a set of device keys 340 to create a new media key Km' 516.

Flow chart 500 continues to element 508, decrypting the secret key. Alternatively, element 508 may be performed before generating the new binding key at element 506. At element 508, the secret key system 226 of a cryptographic system 200 may recover the secret key Ka 316 using the old binding key Kb 312 to decrypt the encrypted secret key EKa 318, substantially similar to the method of FIG. 4 at element 406.

After recovering the secret key Ka 316 and generating the new binding key Kb' 522, flow chart 500 continues to element 510, encrypting the secret key Ka 316. At element 510, the secret key system 226 of the cryptographic system 200 may encrypt the secret key Ka 316 using the new binding key Kb' 522 to produce an encrypted secret key EKa' 524, as represented by the equation:

$$EKa'=E(Kb',Ka)$$

in one embodiment. After producing the new encrypted secret key EKa' 524, flow chart 500 continues to element 512, updating the state of the group of files to reflect the new encrypted secret key EKa' 524, after which the flow chart terminates. Even though the binding information has changed, the title keys Kt 322 for all of the content files need not be re-encrypted. As one of skill in the art will appreciate, re-encrypting only a secret key Ka 316 instead of all title keys Kt 322 associated with a number of content files may significantly reduce the processing resources necessary in response to a change in binding information. The difference in required processing resources increases as the number of content files increasing, making the content encryption process 100 of the disclosed embodiments particularly useful for schemes with large numbers of content files, such as home networks 110.

In an alternative embodiment, additional grouping levels may be achieved by using additional levels of indirection. For example, a new key (Kz) could be used to encrypt several secret keys Ka. For example, the new key Kz could be used to encrypt all the secret keys Ka present on each disk of an optical jukebox. The new key Kz may be re-encrypted whenever the binding information changes, eliminating the need to change the encrypted secret keys EKa. In this embodiment, decryption may require an additional step of decrypting the encrypted secret key EKa with the new key Kz to recover the secret key Ka. Additional layers of indirection may also be added.

The content encryption system 100 of the disclosed embodiments is not restricted to broadcast encryption schemes but may be used for any system where compliant devices may calculate a starting key which resembles in some way the media key Km 308 of the broadcast encryption model. The content encryption system 100 thus may prove useful as a binding model for any scenario where there are several pieces of content that need to be bound to an object whose binding key is likely to change, such as Diffie-Hellman or Public Key Infrastructure (PKI) systems. In one example, a client-server based system may have several different pieces of content stored and each encrypted with a particular title key. Each of these title keys could be encrypted with a server key (equivalent to the secret key Ka) and this server key could be encrypted with a session key (equivalent to the binding key Kb) each certain period of time. When a client connects to the system, it may download the encrypted content with encrypted title keys and also the current encrypted server key. The session key can be acquired using a two-way Diffie-Hellman exchange or a PKI Public key-Private key exchange. The decryption process would be the same as the broadcast encryption model and when the session key changes, there is no need to re-encrypt all the title keys used to encrypt each piece of content.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods, systems, and media for adding an additional level of indirection to title key encryption. It is understood that the form of the invention shown and described in the detailed description and the drawings are to be taken merely as examples. It is intended that the following claims be interpreted broadly to embrace all the variations of the example embodiments disclosed.

What is claimed is:

1. A method for encrypting one or more content files, the method comprising:

generating, by a cryptographic device having one or more computer processors and being part of a home network, a first binding key based on binding information, the binding information comprising a media key block, a binding identifier that is a common network identifier for the home network, and an authorization table indicating all receivers in the home network;

encrypting by the cryptographic device a secret key using the first binding key, the secret key being associated with a group of content files associated with the home network;

generating by the cryptographic device a title key for each of the content files in the group, each title key being associated with one of the content files;

encrypting by the cryptographic device only the title keys for each of the content files using the secret key;

encrypting by the cryptographic device each content file using the title key associated with the each content file;

updating by the cryptographic device a state of each content file based on the encrypted secret key;

receiving by the cryptographic device an indication that the binding information has changed from a source;

generating by the cryptographic device a new binding key to replace the first binding key based on the changed binding information;

recovering the secret key by using the first binding key to decrypt the encrypted secret key;

re-encrypting by the cryptographic device the secret key using the new binding key without re-encrypting each title key and each content file; and updating by the cryptographic device the state of the one or more content files in response to the re-encrypted secret key without updating a state for each title key.

2. The method of claim 1, further comprising storing by the cryptographic device one or more of the encrypted content, the encrypted title key, and the encrypted secret key.

3. The method of claim 1, further comprising transmitting by the cryptographic device one or more of the encrypted content, the encrypted title key, and the encrypted secret key.

4. The method of claim 1, further comprising updating by the cryptographic device a state of the one or more content files in response to the secret key.

5. The method of claim 1, wherein the binding information for generating the first binding key and the new binding key steps comprises:
   wherein the binding information comprises a media key block and a binding identifier;
   processing by the cryptographic device the media key block using a set of device keys to produce a media key; and
   producing by the cryptographic device the binding key based on the media key and the binding identifier.

6. The method of claim 1, further comprising performing a Diffie-Hellman key exchange by the cryptographic system to establish a session key, wherein the established session key is used as the binding key.

7. The method of claim 1, further comprising performing a Public Key-Private Key exchange by the cryptographic system to establish a session key, wherein the established session key is used as the binding key.

8. The method of claim 1, wherein the one or more content files comprises one or more of an audio data file, a video data file, a media data file, a streaming media file, an application file, a text file, or a graphic file.

9. A data processing system for encrypting one or more content files, the system comprising:
   a processor; and
   a computer readable memory storing executable instructions, which when executed by the processor, cause the processor to perform steps of:
   generating a first binding key based on binding information, the binding information comprising a media key block, a binding identifier that is a common network identifier for a home network, and an authorization table indicating all receivers in the home network;
   encrypting a secret key using the first binding key, the secret key being associated with a group of content files associated with the home network;
   generating a title key for each of the content files in the group, each title key being associated with one of the content files;
   encrypting only the title keys for each of the content files using the secret key;
   encrypting each content file using the title key associated with the each content file;
   updating by the cryptographic system a state of each content file based on the encrypted secret key;
   receiving an indication that the binding information has changed from a source;
   generating a new binding key to replace the first binding key based on the changed binding information;
   recovering the secret key by using the first binding key to decrypt the encrypted secret key;
   re-encrypting the secret key using the new binding key without re-encrypting each title key and each content file; and
   updating the state of the one or more content files in response to the re-encrypted secret key without updating a state for each title key.

10. The system of claim 9, further comprising one or more of the encrypted content, the encrypted title key, and the encrypted secret key.

11. The system of claim 9, further comprising updating a state of the one or more content files in response to the secret key.

12. The system of claim 9, wherein the binding information for the generating the first binding key and the new binding key comprises a media key block and a binding identifier; and wherein the system further comprising:
   processing the media key block using a set of device keys to produce a media key; and
   producing the binding key based on the media key and the binding identifier.

13. The system of claim 9, further comprising performing a Diffie-Hellman key exchange to establish a session key, wherein the established session key is used as the binding key.

14. The system of claim 9, further comprising performing a Public Key-Private Key exchange to establish a session key.

15. A computer readable storage device storing computer executable instructions for encrypting one or more content files, wherein the instructions when executed by a computer cause the computer to perform steps of:
   generating, by a cryptographic system having one or more computer processors and being part of a home network, a first binding key based on binding information, the binding information comprising a media key block, a binding identifier that is a common network identifier for the home network, and an authorization table indicating all receivers in the home network;
   encrypting by the cryptographic system a secret key using the first binding key, the secret key being associated with a group of content files associated with the home network;
   generating by the cryptographic system a title key for each of the content files in the group, each title key being associated with one of the content files;
   encrypting by the cryptographic system only the title keys for each of the content files using the secret key;
   encrypting by the cryptographic system each content file using the title key associated with the each content file;
   updating by the cryptographic system a state of each content file based on the encrypted secret key;
   receiving by the cryptographic system an indication that the binding information has changed from a source;
   generating by the cryptographic system a new binding key to replace the first binding key based on the changed binding information;
   recovering the secret key by using the first binding key to decrypt the encrypted secret key;
   re-encrypting by the cryptographic system the secret key using the new binding key without re-encrypting each title key and each content file; and
   updating by the cryptographic system the state of the one or more content files in response to the re-encrypted secret key without updating a state for each title key.

16. The computer readable storage device of claim 15, further comprising computer executable instructions for transmitting by the cryptographic system one or more of the encrypted content, the encrypted title key, and the encrypted secret key.

17. The computer readable storage device of claim 15, further comprising computer executable instructions for updating by the cryptographic system a state of the one or more content files in response to the secret key.

18. The computer readable storage device of claim 15, wherein the binding information for generating the first binding key and the new binding key comprises a media key block and a binding identifier; and wherein the computer readable storage device further comprising computer executable instructions for:

processing by the cryptographic system the media key block using a set of device keys to produce a media key; and producing by the cryptographic system the binding key based on the media key and the binding identifier.

19. The computer readable storage device of claim 15, further comprising computer executable instructions for performing a Diffie-Hellman key exchange by the cryptographic system to establish a session key.

20. The computer readable storage device of claim 15, further comprising computer executable instructions for performing a Public Key-Private Key exchange by the cryptographic system to establish a session key.

* * * * *